United States Patent
Oakes, III et al.

(10) Patent No.: US 9,937,673 B1
(45) Date of Patent: Apr. 10, 2018

(54) PLUMBING SYSTEMS WITH INTEGRATED LEAK DETECTION AND REPAIR

(71) Applicant: United Services Automobile Association (USAA), San Antonio, TX (US)

(72) Inventors: Charles L. Oakes, III, Boerne, TX (US); Jordan Newmark, Fair Oaks Ranch, TX (US); Bradly Jay Billman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 450 days.

(21) Appl. No.: 14/254,174

(22) Filed: Apr. 16, 2014

Related U.S. Application Data (60) Provisional application No. 61/907,028, filed on Nov. 21, 2013.

(51) Int. Cl.
| | | |
|---|---|---|
| *B29C 73/02* | (2006.01) | |
| *B29C 67/00* | (2017.01) | |
| *B29K 101/12* | (2006.01) | |
| *B29L 23/00* | (2006.01) | |

(52) U.S. Cl.
CPC ........ *B29C 73/025* (2013.01); *B29C 67/0055* (2013.01); *B29C 67/0088* (2013.01); *B29K 2101/12* (2013.01); *B29L 2023/22* (2013.01)

(58) Field of Classification Search
CPC ........ B33Y 10/00; B33Y 50/00; B33Y 50/02; B29C 73/02; B29C 73/025; B29C 67/0051; B29C 67/0055; B29C 67/0059; B29C 67/0085; B29C 67/0088; F16L 55/162; F16L 55/1645; F16L 55/1651; F16L 55/26; F16L 55/18; F16L 55/1003; F16L 55/28; F16L 55/30
USPC ........ 264/308, 36.16, 36.17, 267, 269, 312; 700/18, 19
See application file for complete search history.

(56) References Cited

U.S. PATENT DOCUMENTS

| | | | | |
|---|---|---|---|---|
| 5,601,763 | A * | 2/1997 | Hunter | B29C 47/0023 138/97 |
| 6,820,653 | B1 * | 11/2004 | Schempf | B08B 9/043 138/97 |
| 7,112,350 | B1 * | 9/2006 | Roberts | B05B 13/06 427/236 |
| 9,562,632 | B1 | 2/2017 | Billman et al. | |
| 2003/0039752 | A1 * | 2/2003 | Winiewicz | B05B 13/0636 427/236 |
| 2004/0175239 | A1 * | 9/2004 | Pare | B05B 7/0408 405/146 |
| 2006/0118990 | A1 | 6/2006 | Dierkes et al. | |
| 2006/0136182 | A1 | 6/2006 | Vacanti et al. | |
| 2014/0084583 | A1 | 3/2014 | Hemingway et al. | |
| 2015/0345688 | A1 * | 12/2015 | Kersey | F16L 57/06 138/145 |

* cited by examiner

*Primary Examiner* — Alison L Hindenlang
*Assistant Examiner* — Lawrence D. Hohenbrink, Jr.
(74) *Attorney, Agent, or Firm* — Fish & Richardson P.C.

(57) ABSTRACT

A method of repairing a conduit includes generating, from a sensor, a signal representative of an unmanufactured opening in the conduit. The conduit includes a liner material positioned therein. The liner material is operatively engaged to the sensor. The method also includes sealing the unmanufactured opening using the liner material upon generation of the signal by the sensor.

8 Claims, 10 Drawing Sheets

PLUMBING SYSTEMS WITH INTEGRATED LEAK DETECTION AND REPAIR

GROSS-REFERENCES TO RELATED APPLICATIONS

This application claims priority to U.S. Provisional Patent Application No. 61/907,028, filed on Nov. 21, 2013, entitled "Plumbing Systems with Integrated Leak Detection and Repair," the disclosure of which is hereby incorporated by reference in its entirety for all purposes.

The following U.S. patent applications (including this one) are being filed concurrently and the disclosure of the other application is hereby incorporated by reference in its entirety for all purposes:

Application Ser. No. 14/254,167, filed Apr. 16, 2014, entitled "Fabricating Conduits"; and Application Ser. No. 14/254,174, filed Apr. 16, 2014, entitled "Plumbing Systems with Integrated Leak Detection and Repair".

BACKGROUND

Customers demand more of the products and services they use than ever before. They insist that the companies they deal with on a regular basis provide them greater and greater levels of accuracy and more tailored service offerings. Companies configure and operate ever increasing numbers of computer systems to achieve this. Using sources of information that have traditionally been unavailable when servicing these customers is now expected.

SUMMARY OF THE INVENTION

The present invention relates generally to plumbing systems. More specifically, the present invention relates to methods and systems tier inspecting and repairing leaks found in plumbing systems. In an embodiment, the methods and systems discussed herein utilize 3D printing processes and systems to fabricate replacement structures for pipes for water supply systems, buildings, other suitable structures, or the like.

According to an embodiment of the present invention, a method of repairing a conduit is provided. The method includes generating, from a sensor, a signal representative of an unmanufactured opening in the conduit, The conduit includes a liner material positioned therein and the liner material is operatively engaged to the sensor. The method also includes sealing the unmanufactured opening using the liner material upon generation of the signal by the sensor.

According to another embodiment of the present invention, a method of inspecting and repairing a conduit is provided. The method includes receiving an indication of an unmanufactured opening in the conduit and transmitting a signal to a three-dimensional conduit printing device. The method also includes printing a liner material inside the conduit using the three-dimensional conduit printing device and sealing the unmanufactured opening using the printed liner material.

According to some embodiments, a method includes receiving an input corresponding to a location of an unmanufactured opening in a conduit, moving within the conduit to the location of the opening, and collapsing a liner at a location adjacent to the opening such that the collapsed liner prevents fluid from passing therethrough. The method further includes receiving a second input corresponding to a location of a bypass conduit, The bypass conduit can include an input section coupled to the conduit and an output section coupled to the conduit, where the input section includes an input valve and the output section includes an output valve. The input and output valves can be in a closed configuration such that no fluid can pass through.

According to certain embodiments, the method further includes determining if the input section and output section of the bypass conduit are located on opposite sides of the unmanufactured opening, and opening the input and output valve such that fluid can flow through. The collapsing of the liner can be performed by a remote controlled device disposed inside the conduit.

According to further embodiments, s system includes one or more processors, and one or more non-transitory computer-readable storage mediums containing instructions configured to cause the one or more processors to perform operations including receiving an input indicating an unmanufactured opening in a conduit, printing a liner material inside the conduit using the three-dimensional conduit printing device, and sealing the unmanufactured opening using the printed liner material. The indication of the unmanufactured opening can be associated with modification of a material in the plumbing system. The modification of the material can include leaching of a color agent from the material. The input can be received wirelessly. In some implementations, a three-dimensional conduit printing device is disposed inside the conduit performs the printing and sealing of the printed liner material. The three-dimensional conduit printing device can include a propulsion system operable to move the three-dimensional conduit printing device through at least a portion of the conduit.

Numerous benefits are achieved by way of the present invention over conventional techniques. For example, embodiments of the present invention provide methods and systems that enable remote repair of plumbing systems. In some embodiments, a leak detection system is utilized to trigger 3D printing of plumbing components and repair elements, which are then used to seal the leaking structure. These and other embodiments of the invention along with many of its advantages and features are described in more detail in conjunction with the text below and attached figures.

DETAILED DESCRIPTION OF SPECIFIC EMBODIMENTS

Embodiments of the present invention provide methods and systems that can be used to inspect and repair plumbing systems. In a water supply or service implementation, inspection and repair of the supply lines can be performed using a device that travels inside the supply lines. The device can detect leaks in the supply lines or utilize previously obtained information related to one or more leaks in the supply line to reprint new pipe material using a 3D printing process that can be used to repair the break or fracture associated with the leak(s). Thus, remote repair of leaks can be performed using the 3D printing capability provided by embodiments of the present invention.

In another implementation, the 3D pipe printing system could be utilized to install new piping, either in a structure, in the ground, or combinations thereof As an example, a sprinkler system could be designed and the 3D pipe printing system could move through trenches prepared for the sprinkler system, or tunnel through the ground, printing the 3D pipes in the desired location. Using design specifications for the irrigation system, potentially including 3D maps of the area to be irrigated, with some areas needing less irrigation than other areas due to additional runoff, shade, or the like, the 3D pipe printing system can be used to print the pipes that are needed for the irrigation system.

In some embodiments, the ability to contour the internal dimensions of the fluid supply lines provides benefits not available using conventional methods and systems. As an example, embodiments of the present invention enable the separation of flow volume and pressure as design elements in a manner that is not available with conventional pipes. As examples, the flow volume at different locations in the building can be controlled as well as the fluid pressures at various outlets. Moreover, the ability to contour the internal dimensions of the pipe provide opportunities for efficient thermal transfer between fluids in the system.

Figure 1:
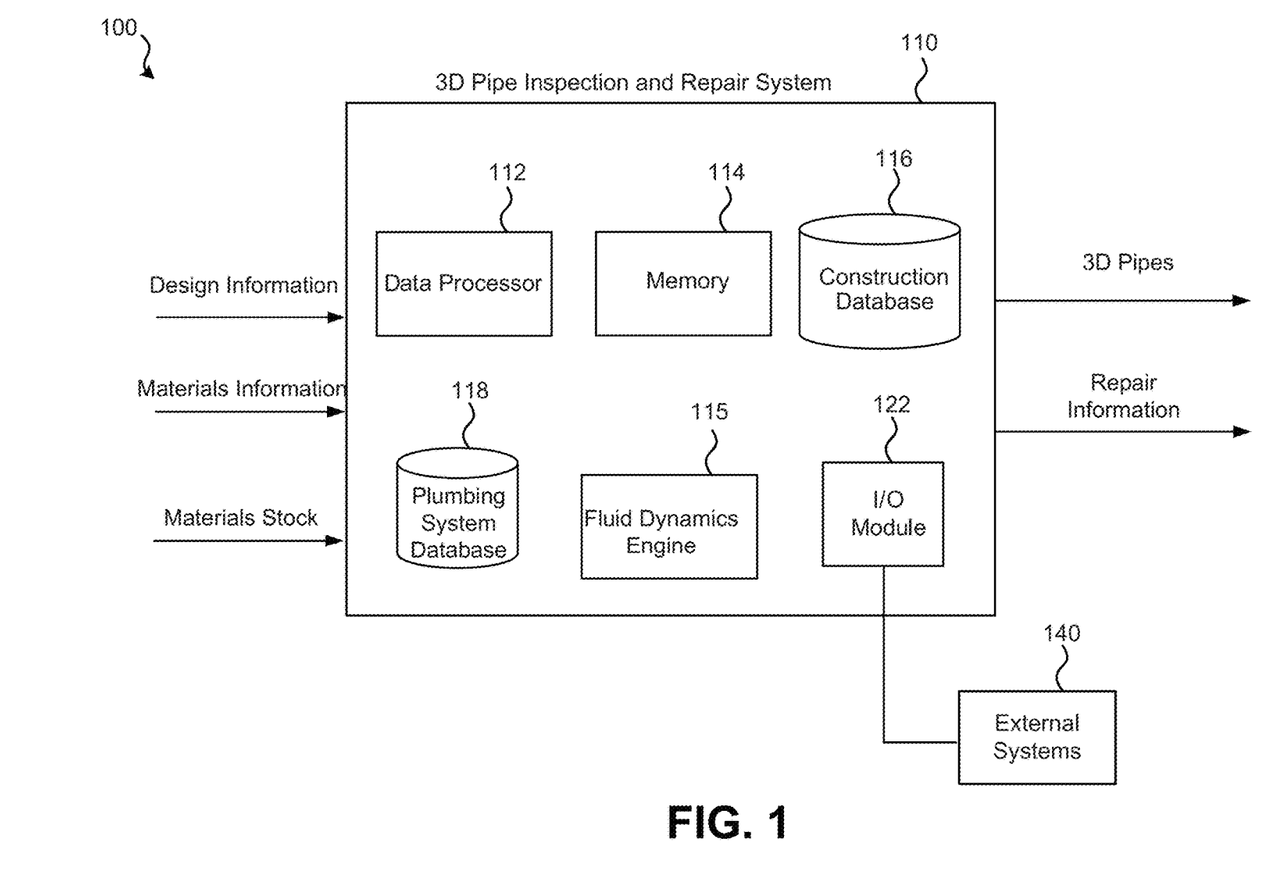
FIG. 1 is a high level block diagram illustrating the relationship between information input and product output according to an embodiment of the present invention.

FIG. 1 shows a high level block diagram for a system 100 for inspecting and repairing plumbing systems according to an embodiment of the present invention. As illustrated in FIG. 1, the system 100 includes a 3D pipe inspection and repair system 110. Design information is received as an input to the 3D pipe inspection and repair system. This design information can include plumbing system schematics, blueprints, or the like.

The 3D pipe inspection and repair system 110 also receives materials information and materials stock, which can include new materials as well as recycled or materials with a predetermined recycled materials content. As an example, at a location where there is existing pipe that has been removed from the building or structure, this existing pipe could be utilized as stock material in the 3D printer and thereby be recycled, to create the new 3D pipe. In one remodeling implementation, pipe that has been removed can be measured to determine the length of the various pipes, for example, by using a scanner that scans the pipes dimensions and then prints 3D pipes to be used as replacements for the pipes that were removed. Depending on the melting point of the various materials recycled and then used for 3D printing of the pipes, the various materials can be processed to provide differing stock materials as a function of processing temperature (e.g., poly vinyl chloride (PVC) at a first temperature, polyethylene (PE) at a second temperature, polypropylene (PPE) at a third temperature, and metals (e.g., aluminum) at a fourth temperature. One of ordinary skill in the art would recognize many variations, modifications, and alternatives.

The 3D pipe inspection and repair system 110 provides outputs including the 3D pipes as well as repair information that can be used in installing and or repairing plumbing using the 3D pipes. Given the inputs, which can include design values from an architectural diagram, a blueprint, or the measurements discussed above (e.g., using a laser scanner or other survey tool), the 3D pipes can be fabricated to the desired specifications.

Referring to the 3D pipe inspection and repair system 110, the plumbing system database 118 may include useful data as well as data that is either outdated or otherwise incorrect for the particular installation. In this case, additional information can be obtained, for example, by measuring the structure or existing plumbing, and providing this additional information as an input to update the plumbing system database information. In an embodiment, a measurement device, such as a laser scanner or other surveying equipment, can take measurements of the physical dimensions of the structure or plumbing elements in the structure and this information can be integrated with the 3D pipe inspection and repair system to determine the characteristics of the 3D pipe to be printed and used in the repair process. As an example, the initial design specifications could call for a pipe of a given length, dimensions, taper angle, and the like (in simplified form, specifications X, Y, and Z), The inspection or measurement of the structure could be used to determine, in real time, that modifications are needed for the pipe, which can then be fabricated to updated length, dimensions, taper angle, and the like (in simplified form, specifications X', Y' and Z), This updated information can then be used to update plumbing system database 118 as well as during fabrication of the 3D pipes.

Construction database 116 is also included as part of the 3D pipe inspection and repair system 110 and can include information on building codes, materials specifications, and the like. The output of the 3D pipe inspection and repair system 110 includes 3D pipes fabricated using the system and repair information, Fluid dynamics engine 115 works in conjunction with the data processor 112 to compute fluid dynamics algorithms useful in designing the 3D pipes printed by the system. In some embodiments, the functionality of the fluid dynamics engine 115 is provided by the data processor 112. One of ordinary skill in the art would recognize many variations, modifications, and alternatives.

Figure 6:
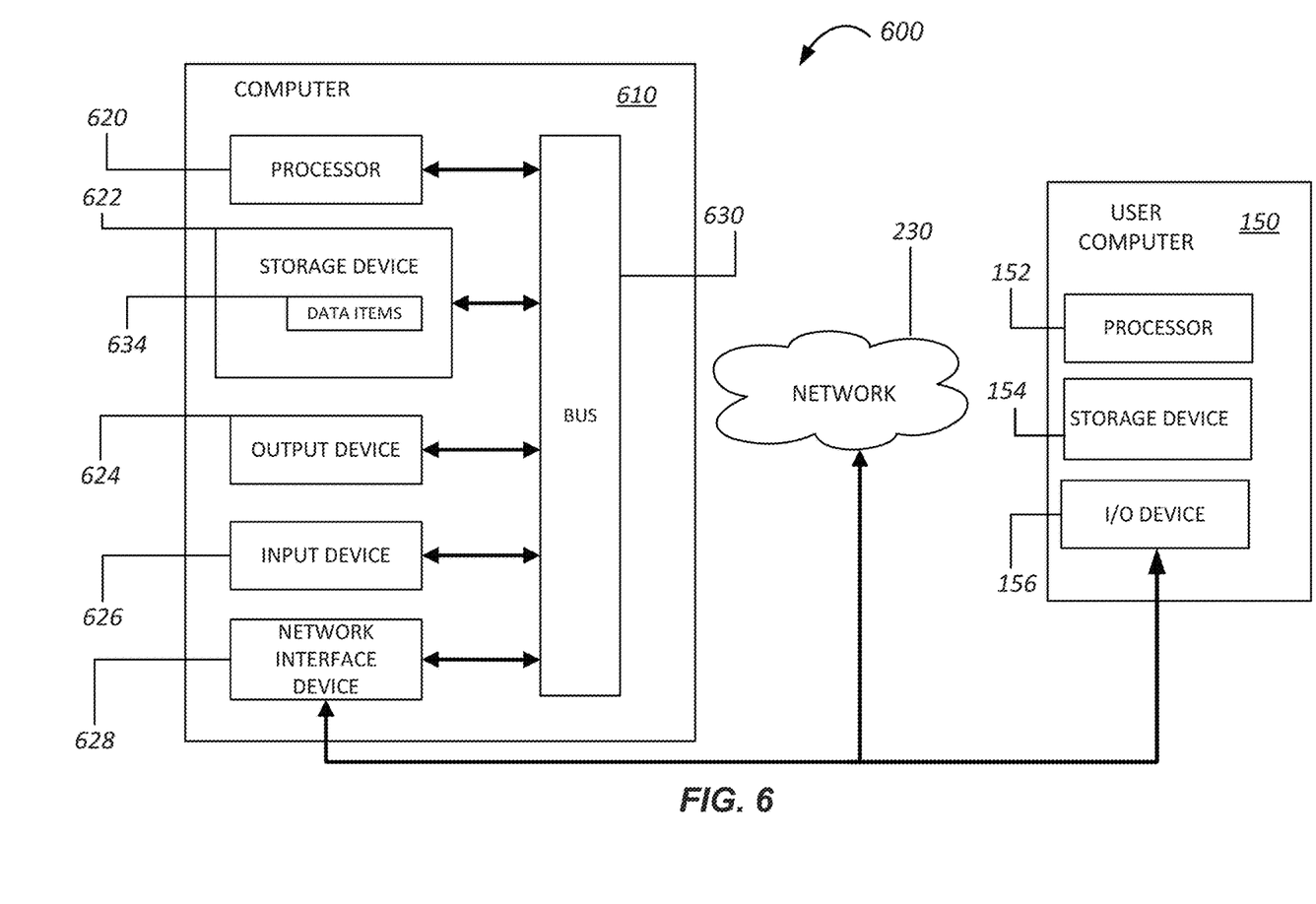
FIG. 6 is a high level schematic diagram illustrating a computer system including instructions to perform any one or more of the methodologies described herein.

Referring to FIG. 1, the 3D pipe inspection and repair system 110 includes a number of components: a data processor 112 (also referred to as a processor), the plumbing system database 116, a memory 114, and the construction database 118. An input/output module 122 is also provided with suitable functionality to interact with an external system 140, which can include one or more external databases. One or more of the elements of the external systems 140 can be operated by the 3D pipe inspection and repair system 110 or by a third party. The description provided in relation to processors and memory in FIG. 6 is also applicable to data processor 112 and memory 114 shown in FIG. 1. These components interact with one another to process the received inputs and to provide the outputs illustrated in FIG. 1.

Although some embodiments are discussed in terms of plumbing and irrigation systems, embodiments of the present invention are not limited to these particular implementations and other fluid handling systems, including heating and air conditioning systems, air handling systems in commercial buildings, and the like are included within the scope of the present invention. By providing control over the inner and outer surfaces of the fluid conduits, including the fabrication of complex structures, implementation of countercurrent exchange, and other heat transfer processes can be implemented. One of ordinary skill in the art would recognize many variations, modifications, and alternatives.

Figure 2:
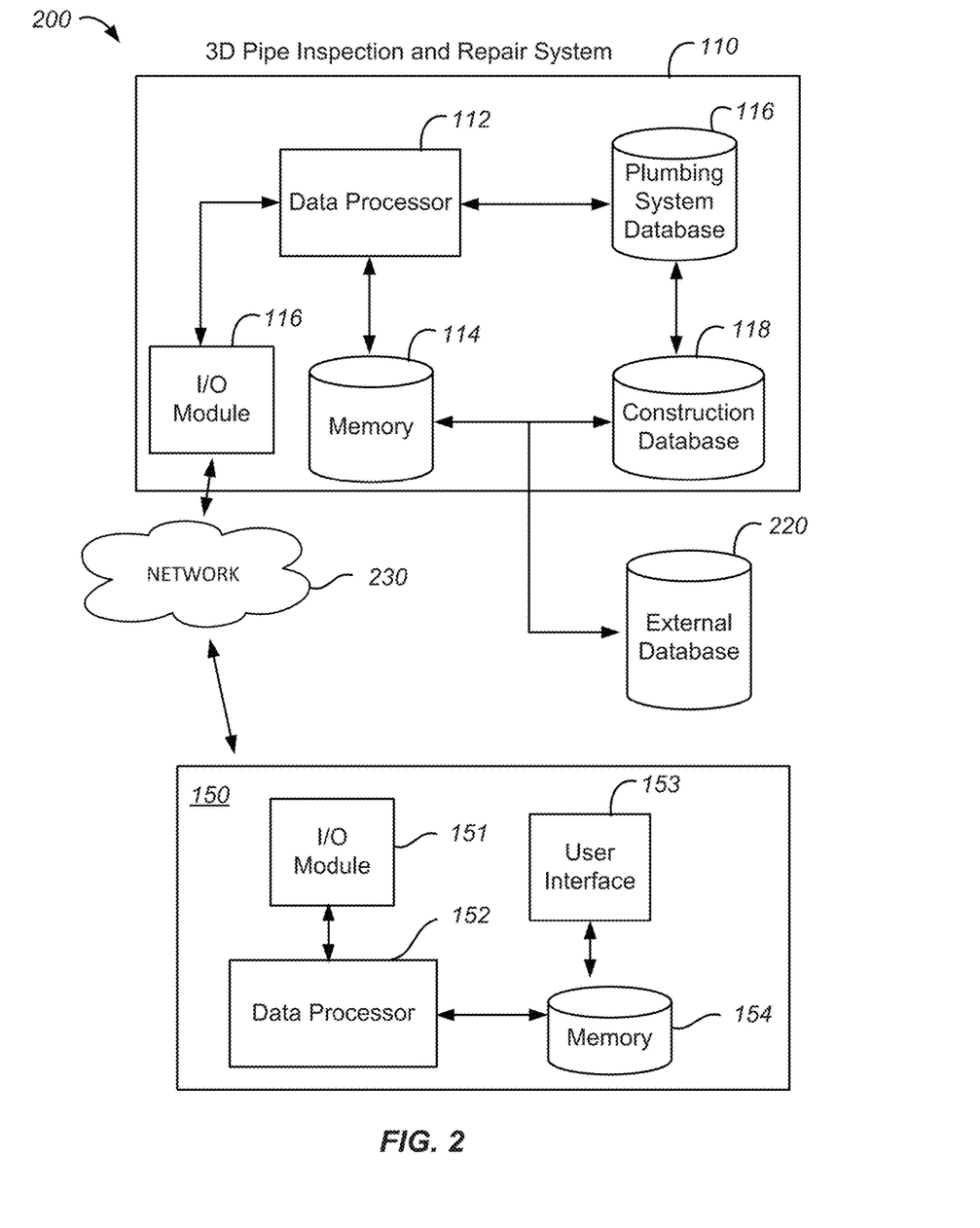
FIG. 2 is a high level schematic diagram illustrating a 3D pipe inspection and repair system according to an embodiment of the present invention.

FIG. 2 is a high level schematic diagram illustrating a 3D pipe inspection and repair system according to an embodiment of the present invention. Referring to FIG. 2, a network capable device 150 includes a number of components: a data processor 152 (also referred to as a processor), an input/output module 151, a user interface 153, and a memory 154. The network capable device 150 can communicate with the inspection and repair system 110 via network 230

Referring to FIG. 2, the 3D pipe inspection and repair system 110 receives information from the network capable device and provides outputs to the network. capable device. Examples of interactions between the network capable device 150 and the 3D pipe inspection and repair system 110 are discussed in additional detail in relation to FIG. 5 below. External database 220 is provided for use by the 3D pipe inspection and repair system 110 as appropriate to the particular application.

Although some embodiments have been discussed in terms of designing the 3D pipes for predetermined flow rates, flow volume, flow pressures, and the like, the present invention is not limited to this design philosophy. In other embodiments, fluid dynamics software is utilized to receive input specifications on flow rate/volume/pressure at various outlets along with position information on the various outlets as well as information on the structure and the system then computes the structure of the 3D pipe suitable for providing the desired flow specifications at the various outlets. In these embodiments, the fluid output is specified and the pipe is then designed to provide these desired flow specifications.

Some embodiments of the present invention provide the capability to manufacture flexible 3D pipe materials. Flexible materials are useful when elements of the construction, such as the foundation, move over time. Another example is a pool liner, which can shill over time. Flexible materials will reduce the likelihood of leaks in these contexts.

Another example of the 3D printing of flexible pipes is the printing of pipes that can change shape upon expansion. The 3D structure of the pipe could enable the pipe to expand in size if the fluid freezes and expands, preventing breakage as a result of freezing. In these implementations, the cross section of the pipe will change as the fluid pressure increases inside the pipe, expanding the cross section. The internal contours of the pipe could also provide this flexible ability to expand, preventing cracking or rupturing.

In some plumbing systems that are buried in the ground, growth of roots and movement of rocks can result in cracking and breakage of pipes that are in contact with the roots/rocks. Flexible pipes would reduce the likelihood of such cracking and breakage.

In addition to flexible materials, the 3D printing process can be utilized to fabricate pipes or other fluid handling structures that have different materials making up the structure. As an example, a pipe with two different materials can be printed, providing an inner lining of one type of material and an outer skin of a different material. Additionally, joints or bends in a pipe can be reinforced during fabrication by printing materials with higher strength characteristics at the joint or bend. Thus, in this example, lengths of pipe could be printed in a first material (e.g., aluminum) and the joints could be printed in a second material (a rubberized material) with the fabrication producing a single structure. In addition to flexible materials, reinforcing materials can be printed, for example, at joints or bends, with the thickness of the pipe being increased at the joint or bend to provide additional mechanical support to withstand shearing or other forces. Additionally, the thickness and other characteristics of the pipe can be varied using the 3D printing process to provide structural reinforcement to support varying fluid pressures as a function of pipe length, which may be different for straight lengths of pipe and bent sections of pipe. These structure reinforcements can take the form of increased pipe thickness, ribbing, bracing, or the like.

In addition to flow characteristics and structural support, the 3D printing process provides a mechanism to customize the pipe in relation to the environment in which the pipe resides. As an example, a device that measures wind speed, sunlight exposure, heat, and other environmental factors as a function of location could be used to collect environmental data. In response to this environmental data, the pipe can be customized with integrated radiator fins for heat dissipation, increased thickness to prevent freezing, or the like. Thus, embodiments of the present invention provides pipes that vary in characteristics as a function of position to provide customized performance.

In some embodiments utilizing multiple materials during the printing process, the pipe could include an inner material that is reactive to air or otherwise changes in response to exposure to air that would accompany a leak in the pipe. As an example, this inner material that is formed during the 3D printing process can leach a color into the fluid flowing in the pipe, providing an indication that a leak is present in the pipe.

In some embodiments, concepts discussed herein are combined as part of the 3D printing process. As an example, inputs can be received about fluid pressures and flow rates/volumes at particular outlets. Fluid dynamics software is then used to determine the lengths, internal diameters, and the like to provide the desired fluid specifications. In conjunction with this design process, structural specifications for the pipes can be received as inputs, with modeling software providing designs for the pipe structural features that provide the desired structural rigidity, flexibility, and the like for the system. Thus, in these embodiments, the pipe features as a function of position can be designed and fabricated to meet multiple goals such as pipe inner diameter to achieve fluid specifications and pipe thickness or bracing to achieve structural specifications.

Although some embodiments are described in relation to the inner diameter of the pipe, it will be appreciated that the inner surface features of the pipe will have an impact on the fluid dynamics properties of the pipe. According to embodiments of the present invention, contouring of the inner surfaces of the pipe can be accomplished using the 3D printing process in ways not achievable using conventional piping materials. As an example, contouring of the inner surfaces can be provided to increase or maximize surface area or the like. In applications in which heat transfer between the fluid and the pipe is desired, the internal contours can be designed to increase the surface area and the resulting heat transfer between the fluid and the pipe. Thus, in a building, some pipes that transfer hot water can be designed to provide low thermal conductivity, reducing heat loss, whereas pipes in a heat exchanger can be designed with high thermal conductivity to facilitate heat transfer. Thus, in an irrigation installation, the internal contour could be designed to provide low thermal conductivity, reducing the depth at which the pipes are buried to avoid damage as a result of freezing and associated installation costs.

Another example of the design flexibility provided by the 3D printing process is that a capillary system can be used in which for specific portions of the plumbing system in which pressure and flow are to be reduced, a single line could split into multiple lines having reduced pressure and flow. These multiple lines can then be recombined at a desired location into a single line to reestablish the original pressure and flow.

Figure 3A:
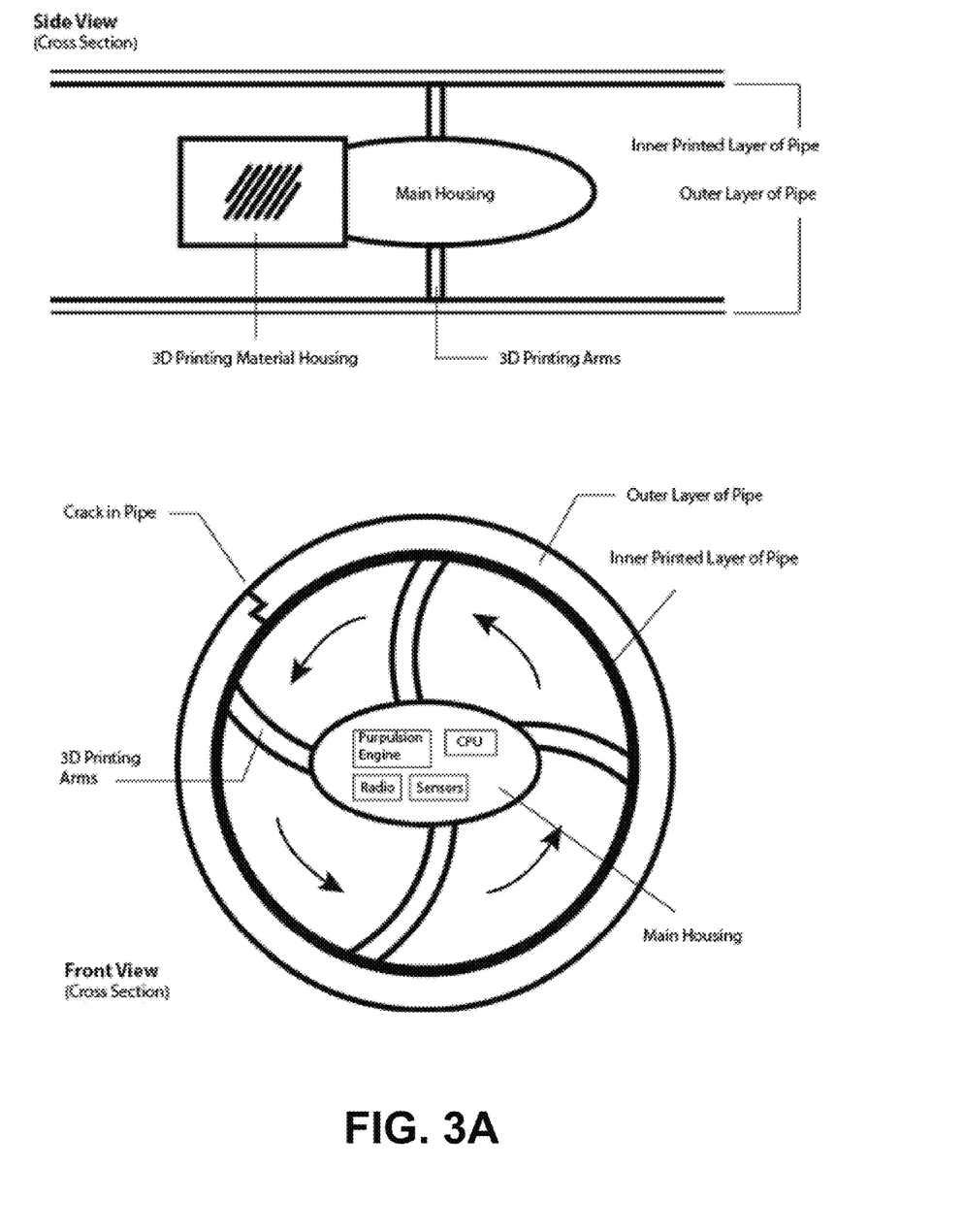
FIG. 3A is a high level schematic diagram illustrating a 3D pipe inspection and repair device according to an embodiment of the present invention.

FIG. 3A is a high level schematic diagram illustrating a 3D pipe inspection and repair device according to an embodiment of the present invention. The 3D pipe inspection and repair device, which is illustrated in side view (cross section) and front or end view (cross section) includes a main housing with 3D printing arms extending from the main housing. A housing that contains 3D printing material is coupled to the main housing. Using the 3D printing arms, the inner layer of the pipe can be printed, providing a seal to stop leaks that occur in the outer layer of pipe.

As illustrated in FIG. 3A, the main housing can include a propulsion unit, a CPU or other suitable processor, a memory, a wireless communications unit, and one or more sensors. Using the methods and systems described herein, the 3D pipe printing system can move along the length of the pipe, gathering data using the sensors, and repairing cracks by printing the inner layer of the pipe in response to external commands or autonomously. This particular embodiment depicts the repair device with four 3D printing aims, however any number of printing arms can be used. In some cases, the 3D printing process can be achieved by a spray application (e.g., nozzle) or other device capable of depositing materials onto a surface. Each arm can be used to deposit a particular material to an inner surface of the pipe to, e.g., repair, deconstruct, or seal a portion of pipe. In some implementations, multiple layers can be applied with each layer being comprised of the same material or of different materials. The multiple layers can be applied by the same arm, all of the arms, or a subset thereof. For example, in FIG. 3A, two arms may apply a first material and two additional arms may apply the second material.

In some embodiments, the processor can analyze diagnostics collected prior to arrival at a breach site, or at the breach site and determine a suitable material or combination of materials to apply to the breach. Sensors can be embedded in key areas of the pipe that can be configured to detect pressure changes and pipe integrity (e.g., leaks, weakened regions of piping, etc.). Sensors can also be locally incorporated in the repair device that can be used to detect pressure, pipe integrity, leaks, and the like. Diagnostics could be collected from remote or local sensors, as would be appreciated by one of ordinary skill in the art.

Figure 3B:
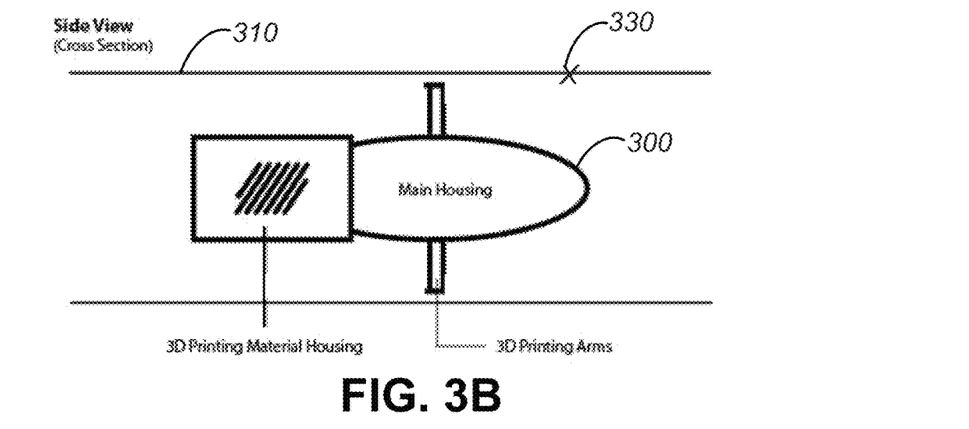
FIG. 3B is a high level schematic diagram illustrating a 3D pipe inspection and repair device according to an embodiment of the present invention.
Figure 3C:
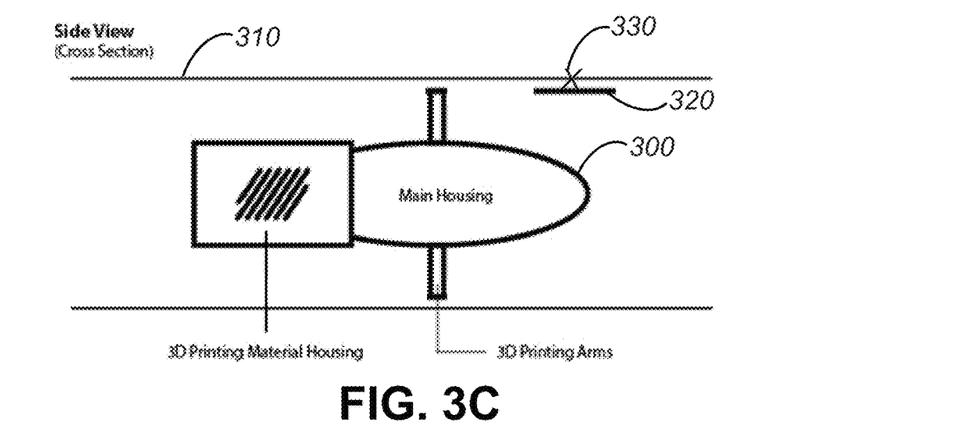
FIG. 3C is a high level schematic diagram illustrating a 3D pipe inspection and repair device according to an embodiment of the present invention.

FIG. 3B is a high level schematic diagram illustrating a 3D pipe inspection and repair device 300 according to an embodiment of the present invention, This embodiments illustrates how liners and repairs can be made on small portions of pipe, rather than adding a liner along the entire pipe. FIG. 3B shows repair device 300 moving along pipe 310 toward a breach 330. In contrast to FIG. 3A, no liner has been deposited on pipe 310. In FIG. 3C, the breach has been repaired with a patch (e.g., liner 320) by repair device 300. As repair device 300 moves away from the repaired region, a liner, plug, or patch (or other repair technique) is deposited at the site of breach 330. In some embodiments, the liner can be printed to cover the entire circumference of pipe 310 at the site of breach 330. Alternatively, the liner may only cover portions of the circumference. Thus, repairs can be applied in a customizable fashion to accommodate any size, shape, or type of breach in any type of pipe or flow structure, and can cover the entire inner length of a pipe or any portion thereof.

Figure 3D:
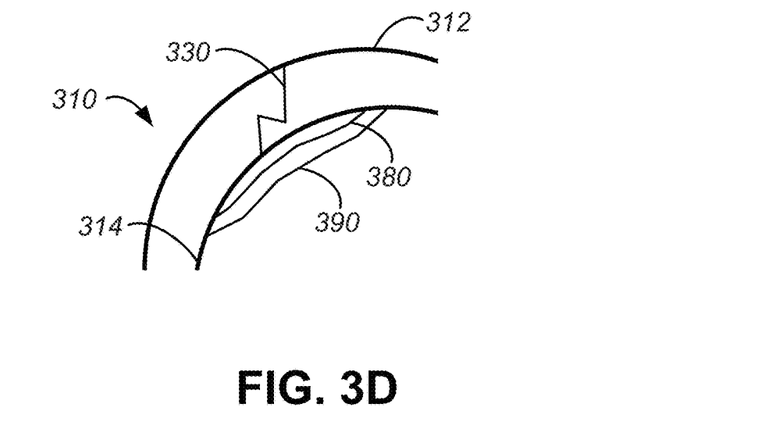
FIG. 3D illustrates a high level schematic diagram illustrating a pipe repair process, according to certain embodiments of the invention.

FIG. 3D illustrates a high level schematic diagram illustrating a pipe repair process, according to certain embodiments of the invention. Pipe 310 includes an outer side 312 and an inner side 314 with a breach or crack 330 therein, In some implementations, different materials can be used to repair a breach. For example, a first material 380 can be used to fill the crack or breach (e.g., epoxy) to repair the pipe itself. A second material 390 can he deposited as a sealant (e.g., lining, patch, etc.). Any suitable materials can be used and any number of materials can be applied as required. In each case, repair device 300 can apply each type of material in any order and by an means either described in the other embodiments or any suitable method of application, as would be appreciated by one of ordinary skill in the art with the benefit of this disclosure.

In an embodiment, the 3D pipe inspection and repair device can operate using wireless communications. Positioned inside a plumbing system, the device can be provided with the ability to move through the plumbing system using one or more modes of propulsion. To repair leaks, the device can print an inner lining that is positioned inside the pipe, sealing off the damaged portion of the pipe causing the leak. In another embodiment, a valve material (e.g., an inner liner) can be fabricated inside the pipe using a 3D printing process and if a leak is detected, in response to a wireless signal or other appropriate trigger, can collapse within the pipe, sealing off the pipe and preventing additional leakage. Thus, in a condition where repair could be delayed, prevention of further damage from the water leak can be prevented by this sealing of the pipe, In some embodiments, after the leak is repaired, the material in the pipe can return to the original configuration, restoring flow through the pipe. Thus, both automated response (sealing) and directed response (unsealing) can be implemented. One of ordinary skill in the art would recognize many variations, modifications, and alternatives.

As described above, the materials of the pipe and the inner lining can differ. In some implementations, contact between these different materials can be used to detect a leak event. As an example, in one implementation, the inner and outer material layers of the pipe can react to a breach (crack) of the outer layer, exposing the inner layer to outside elements (e.g., air, soil, etc.). In response to the breach, the two (or more) layers of materials of different types would undergo a reaction (e.g., chemical or the like) that would occur due to the external entry of the environment (e.g., air, soil, etc.) surrounding the pipe. The reaction would cause the material of the inner layer to enter the cracked outer layer, fusing the two materials and resulting in sealing of the breach.

In embodiments in which the pipe is sealed in response to the trigger, for example, a wireless signal, a series of bypass features can be printed using 3D printing (e.g., periodically) to provide for alternative flow paths that can be utilized to bypass the sealed portion of the pipe.

Figure 4A:
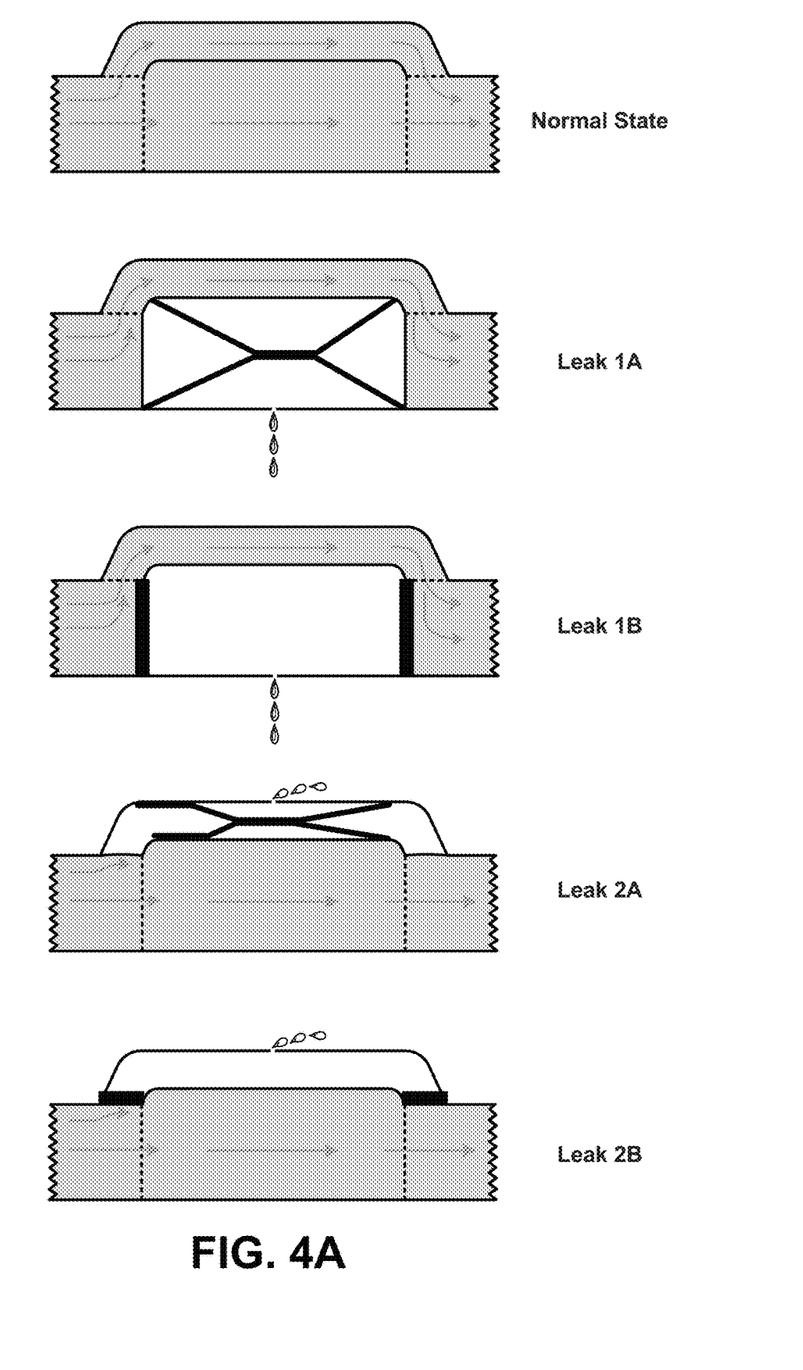
FIG. 4A is a simplified schematic diagram illustrating a 3D pipe printing system including bypass features according to an embodiment of the present invention.
Figure 4B:
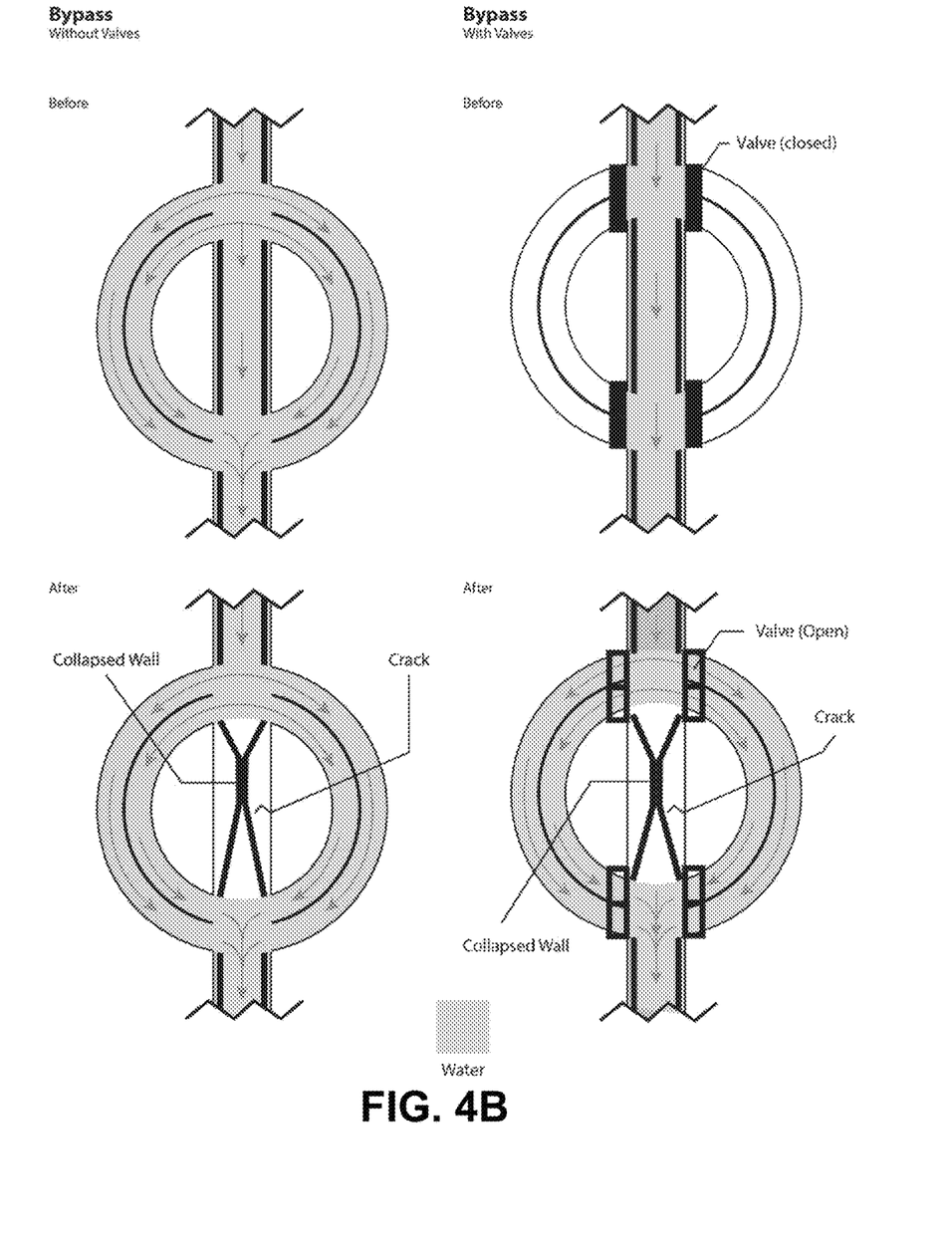
FIG. 4B is a simplified schematic diagram illustrating a 3D pipe printing system including bypass features according to another embodiment of the present invention.

FIG. 4A is a simplified schematic diagram illustrating a 3D pipe printing system including bypass features according to an embodiment of the present invention. FIG. 4B is a simplified schematic diagram illustrating a 3D pipe printing system including bypass features according to another embodiment of the present invention. As illustrated in FIG. 4A, water flow through the bypass region at the top of the pipe as well as the central region at the bottom of the pipe. 3D printing capability is provided to form solid structures at the locations shown by dashed lines. In the Leak 1A and 1B conditions, a leak on the bottom of the pipe results in the bypass region being used. In leak 1A, the lining on the walls of the central region are collapsed. In leak 1B, the two vertical walls of the pipe are printed, blocking off the central region and causing flow to be limited to the bypass region. In the Leak 2A and 2B conditions, a leak on the top of the pipe results in the central region being used. In the 2A condition, the lining on the bypass walls are collapsed to stop the leak. In the 2B condition, two horizontal walls of the pipe are printed, blocking off the bypass region and causing flow to be limited to the central region.

As illustrated in FIG. 4B, a bypass section can be used, either with or without valves. In a first embodiment without valves (top left), flow is initially through both the central portion and circular bypass portions of the pipe. When a crack occurs in the central portion (bottom left), the wall material collapses, preventing flow through the central portion and leaking through the crack. As a result, the water or other fluid flows through the circular bypass region as illustrated. The collapsed wall material can be printed using the 3D printing capabilities. A collapsed wall material can also be disposed in the bypass region.

In another embodiment with valves (top right), valves can be used to open the bypass region as needed. In this embodiment the valves are illustrated in the closed position, If the pipe carrying the water is breached, the valves can be opened and the walls in the cracked region can be collapsed (bottom right). In other embodiments, rather than collapsing the walls, additional material is printed to seal the breached section.

Figure 4C:
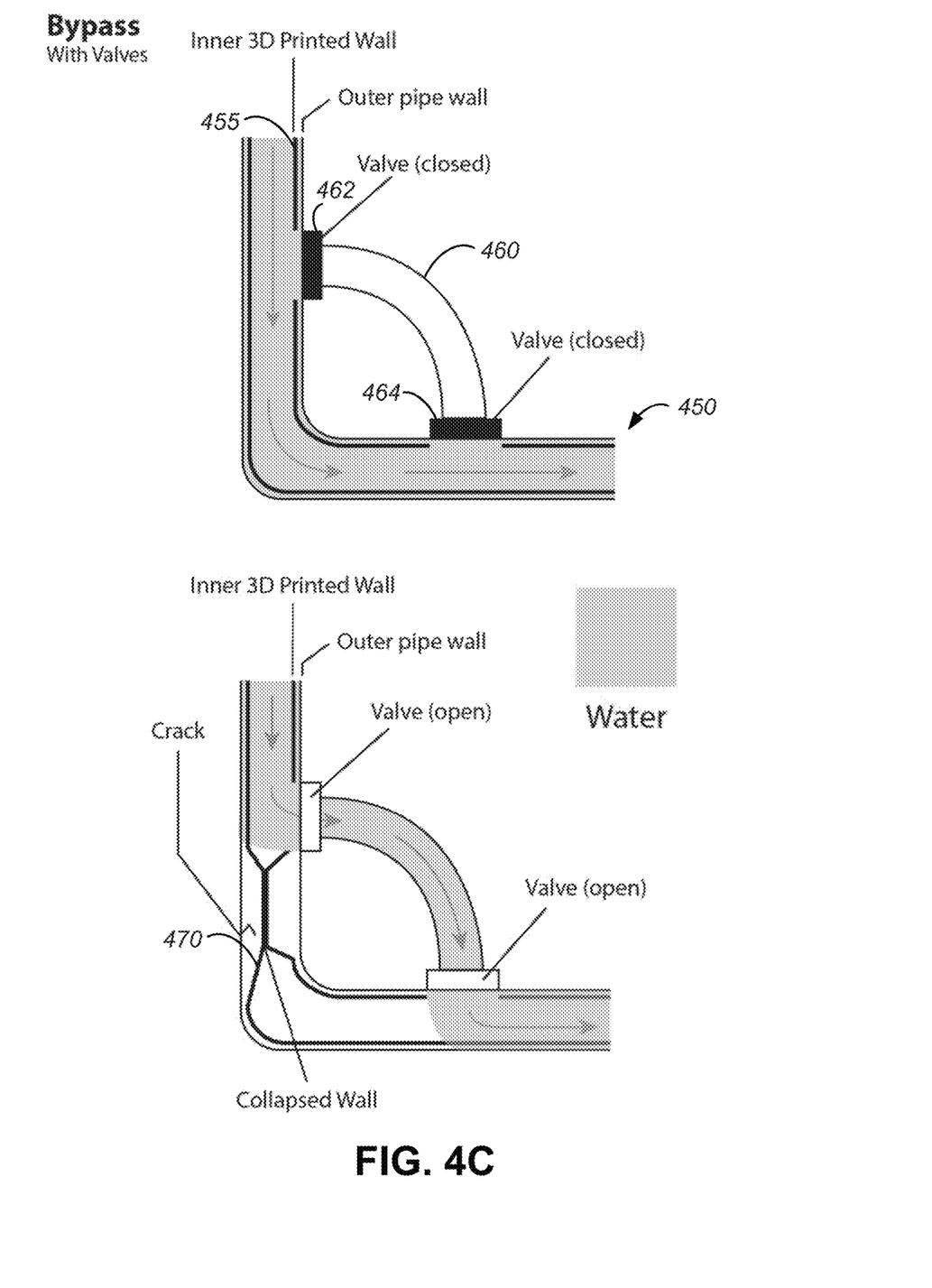
FIG. 4C is a simplified schematic diagram illustrating a 3D pipe printing system including bypass features according to another embodiment of the present invention.

FIG. 4C illustrates another pipe 450 implementing a bypass section with valves that can be used in the event of a breach, according to certain embodiments of the invention. In this particular embodiment, the pipe has an L-shape with a bypass region 460 that is configured to circumvent the corner of the L-shaped pipe should a breach occur in that region. The pipe includes an inner 3D printed wall 455. Bypass region 460 includes two valves 462, 464 in a closed configuration. When a leak occurs in the corner of pipe 450, the inner wall can collapse at 470, which can prevent any further leakage in the breached area. Valves 462, 464 open, which provides an alternate flow path. In other embodiments, rather than collapsing the walls, additional material is printed to seal the breached section.

The sealing of the pipe as described herein enables more rapid and cost effective repair since the damaged area has been identified on a local scale. It should be noted that 3D printing enables the fabrication of mechanical valves, electro-mechanical valves utilizing an electric sensor for leak detection, or the like.

As an alternative technique of sealing the pipe, in response to a signal that a leak has been detected, particles can he printed inside the pipe during fabrication using the 3D printing process or other suitable manufacturing process, including nano-particles, that detach to seal the pipe. Thus, some embodiments provide a system in which the inner lining of the pipe collapses (e.g., at the breach) in response to signals from nano-particle sensors integrated during the pipe fabrication process. In these embodiments, the repair device (e.g., as illustrated in FIG. 3A) is optional and does not have to be present at the breach location. Nano-particles can be used to detect a breach, a repair, or condition of the pipe and provide feedback to repair unit 300, a base station, or intermediary communication device. Because different materials can be printed during the fabrication of the pipe, materials that contract or expand in response to an input could be utilized to seal the pipe and prevent additional leakage. Ire various embodiments of the present invention, sensors can be used to provide information on the operation and condition of the conduits as described more fully herein. One of ordinary skill in the art would recognize many variations, modifications, and alternatives.

Figure 5A:
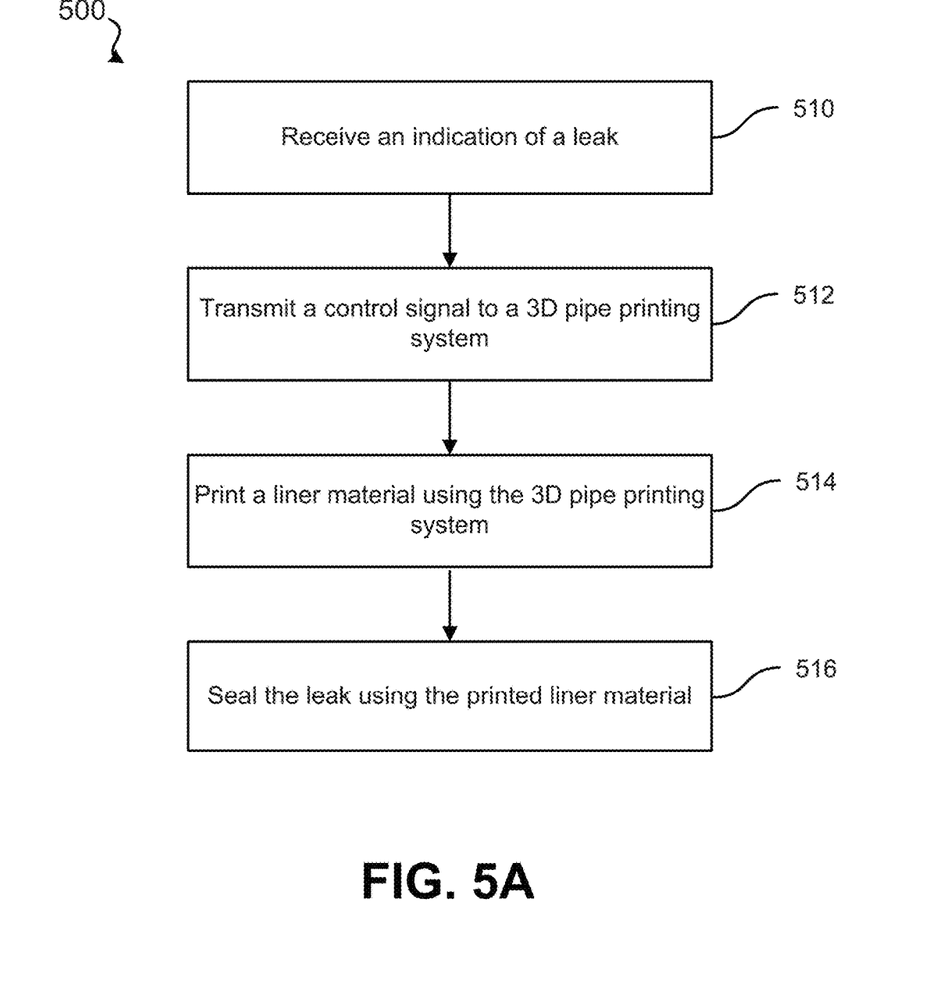
FIG. 5A is a high level flowchart illustrating a method of inspecting and repairing a plumbing system according to an embodiment of the present invention.

FIG. 5A is a high level flowchart illustrating a method 500 of inspecting and repairing a plumbing system according to an embodiment of the present invention. The method 500 includes receiving an indication that a leak has occurred in the plumbing system (510) and transmitting a control signal (e.g., a wireless signal) to a 3D pipe printing system (512). In an embodiment, the indication of the leak is associated with modification of a material in the plumbing system, for example, leaching of a color agent from the material as a result of the teak.

The method also includes printing a liner material inside the plumbing system using the 3D pipe printing system (514) and sealing the leak using the printed liner material (516). The 3D pipe printing system can be disposed inside the plumbing system, enabling repair of leaks without needing access (e.g., cutting into) the plumbing system. The 3D pipe printing system can utilize a propulsion system to move the 3D pipe printing system through at least a portion of the plumbing system.

It should be appreciated that the specific steps illustrated 5A provide a particular method of inspecting and repairing a plumbing system according to an embodiment of the present invention. Other sequences of steps may also be performed according to alternative embodiments. For example, alternative embodiments of the present invention may perform the steps outlined above in a different order. Moreover, the individual steps illustrated in FIG. 5A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5B:
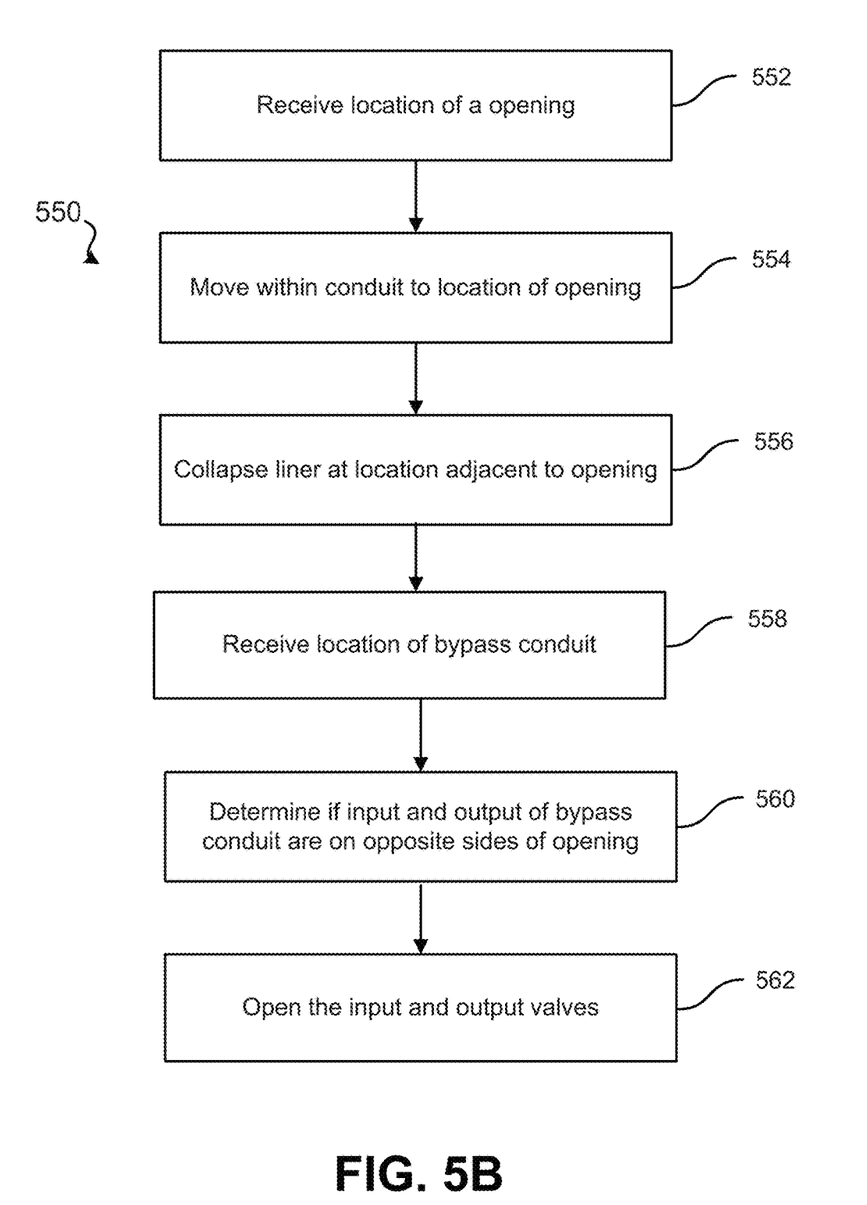
FIG. 5B is a high level flowchart illustrating a method of inspecting and repairing a plumbing system according to an embodiment of the present invention.

FIG. 5B is a high level flowchart illustrating a method 550 of inspecting and repairing a plumbing system according to an embodiment of the present invention. The method 550 includes receiving an input corresponding to a location of an unmanufactured opening in a conduit (510) and moving within the conduit to the location of the opening (554) to collapse a liner at a location adjacent to the opening such that the collapsed liner prevents fluid from passing therethrough (556). Method 550 further includes receiving a second input corresponding to a location of a bypass conduit (558). The bypass conduit can include an input section coupled to the conduit and an output section coupled to the conduit. The input section can includes an input valve and the output section includes an output valve, both in a closed configuration such that no fluid can pass therethrough. Method 550 continues with determing if the input section and output section of the bypass conduit are located on opposite sides of the unmanufactured opening (560), and opening the input and output valves such that fluid can flow therethrough (562). In some cases, collapsing the liner and/or opening the valves can he performed by a remote controlled device disposed inside the conduit.

It should be appreciated that the specific steps illustrated in FIG. 5B provide a particular method of inspecting and repairing a plumbing system according to an embodiment of the present invention. Other sequences of steps may also be performed according to alternative embodiments. For example, alternative embodiments of the present invention may perform the steps outlined above in a different order. Moreover, the individual steps illustrated in FIG. 5B may include multiple sub-steps that may be performed in various sequences as appropriate to the individual step. Furthermore, additional steps may be added or removed depending on the particular applications. For example, some bypass conduits may only have one valve, the conduit itself may include one or more valves in addition to, or in lieu of, a collapsible liner. One of ordinary skill in the art would recognize many variations, modifications, and alternatives.

FIG. 6 is high level schematic diagram illustrating a computer system including instructions to perform any one or more of the methodologies described herein. A system 600 includes a computer 610 connected to a network 230. The computer 610 includes a processor 620 (also referred to as a data processor), a storage device 622, an output device 624, an input device 626, and a network interface device 628, all connected via a bus 630. The processor 620 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 620 executes instructions and includes that portion of the computer 610 that controls the operation of the entire computer. Although not depicted in FIG. 6, the processor 620 typically includes a control unit that organizes data and program storage in memory and transfers data and other information between the various parts of the computer 610. The processor 620 receives input data from the input device 626 and the network 230 reads and stores code and data in the storage device 622 and presents data to the output device 624.

Although the computer 610 is shown to contain only a single processor 620 and a single bus 630, the disclosed embodiment applies equally to computers that may have multiple processors and to computers that may have multiple busses with some or all performing different functions in different ways.

The storage device 622 represents one or more mechanisms for storing data. For example, the storage device 622 may include read-only memory (ROM), random access memory (RAM), magnetic disk storage media, optical storage media, flash memory devices, and/or other machine-readable media. In other embodiments, any appropriate type of storage device may be used. Although only one storage device 622 is shown, multiple storage devices and multiple types of storage devices may be present. Further, although the computer 610 is drawn to contain the storage device 622, it may be distributed across other computers, for example on a server.

The storage device 622 includes a controller (not shown in FIG. 6) and data items 634. The controller includes instructions capable of being executed on the processor 620 to carry out the methods described more fully throughout the present specification. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 622 may also contain additional software and data (not shown), which is not necessary to understand the invention.

Although the controller and the data items 634 are shown to be within the storage device 622. in the computer 610, some or all of them may be distributed across other systems, for example on a server and accessed via the network 230.

The output device 624 is that part of the computer 610 that displays output to the user. The output device 624 may be a liquid crystal display (LCD) well-known in the art of computer hardware. But, in other embodiments the output device 624 may be replaced with a gas or plasma-based flat-panel display or a traditional cathode-ray tube (CRT) display. In still other embodiments, any appropriate display device may be used. Although only one output device 624 is shown, in other embodiments any number of output devices of different types, or of the same type, may be present. in an embodiment, the output device 624 displays a user interface.

The input device 626 may be a keyboard, mouse or other pointing device, trackball, touchpad, touch screen, keypad, microphone, voice recognition device, or any other appropriate mechanism for the user to input data to the computer 610 and manipulate the user interface previously discussed. Although only one input device 626 is shown, in another embodiment any number and type of input devices may be present.

The network interface device 628 provides connectivity from the computer 610 to the network 230 through any suitable communications protocol. The network interface device 628 sends and receives data items from the network 230.

The bus 630 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 610 may be implemented using any suitable hardware and/or software, such as a personal computer or other electronic computing device. Portable computers, laptop or notebook computers, PDAs (Personal Digital Assistants), mobile phones, pocket computers, tablets, appliances, telephones, and mainframe computers are examples of other possible configurations of the computer 610. For example, other peripheral devices such as audio adapters or chip programming devices, such as EPROM (Erasable Programmable Read-Only Memory) programming devices may be used in addition to, or in place of, the hardware already depicted.

The network 230 may be any suitable network and may support any appropriate protocol suitable for communication to the computer 610, In an embodiment, the network 230 may support wireless communications. In another embodiment, the network 230 may support hard-wired communications, such as a telephone line or cable, In another embodiment, the network 230 may support the Ethernet IEEE (Institute of Electrical and Electronics Engineers) 802.3x specification. In another embodiment, the network 230 may be the Internet and may support IP (Internet Protocol). In another embodiment, the network 230 may be a local area network (LAN) or a wide area network (WAN). In another embodiment, the network 230 may be a hotspot service provider network. In another embodiment, the network 230 may be an intranet. In another embodiment, the network 230 may be a GPRS (General Packet Radio Service) network, In another embodiment, the network 230 may be any appropriate cellular data network or cell-based radio network technology. In another embodiment, the network 230 may be an IEEE 802.11 wireless network. In still another embodiment, the network 230 may be any suitable network or combination of networks. Although one network 230 is shown, in other embodiments any number of networks (of the same or different types) may be present.

A user computer 250 can interact with computer 610 through network 230. The user computer 250 includes a processor 252, a storage device 254, and an input/output device 256. The description related to processor 620 and storage device 622 is applicable to processor 252 and storage device 254. As an example, the user computer 250 can be a personal computer, laptop computer, or the like, operated by a member of a membership organization (e.g., the present assignee). Using the user computer 250, the member can then interact with computer 610 operated by the present assignee through network 230 in order to access the present assignee's web pages or the like.

The embodiments described herein may be implemented in an operating environment comprising software installed on any programmable device, in hardware, or in a combination of software and hardware, Although embodiments have been described with reference to specific example embodiments, it will be evident that various modifications and changes may be made to these embodiments without departing from the broader spirit and scope of the invention, Accordingly, the specification and drawings are to he regarded in an illustrative rather than a restrictive sense.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of repairing a conduit, the method comprising:
   receiving, by a three-dimensional (3D) conduit printing device disposed inside a conduit, from a sensor, a signal representative of an unmanufactured opening in the conduit;
   in response to receiving the signal, collapsing, by the 3D conduit printing device, a liner adjacent to the unmanufactured opening such that the collapsed liner hinders the flow of fluid from passing through a portion of the conduit that has the unmanufactured opening;
   printing, by the 3D conduit printing device, liner material for sealing the unmanufactured opening; and
   sealing, by the 3D conduit printing device, the unmanufactured opening using the printed liner material.

2. The method of claim 1, further comprising transmitting the signal to a notification system to alert a user of the unmanufactured opening.

3. The method of claim 1 wherein sealing the unmanufactured opening comprises printing a sealant using the three-dimensional conduit printing device.

4. A method of inspecting and repairing a conduit, the method comprising:
   receiving, by a three-dimensional (3D) conduit printing device disposed inside a conduit, an indication of an unmanufactured opening in the conduit;
   in response to receiving the indication, collapsing, by the 3D conduit printing device, a liner adjacent to the unmanufactured opening such that the collapsed liner hinders the flow of fluid from passing through a portion of the conduit that has the unmanufactured opening;
   printing, by the 3D conduit printing device, a first material and a second material for sealing the unmanufactured opening; and
   sealing, by the 3D conduit printing device, the unmanufactured opening using the printed first material and second material, wherein the sealing includes:
      applying the first material to the unmanufactured opening using a first 3D printing arm of the 3D conduit printing device, and
      applying the second material to the unmanufactured opening using a second 3D printing arm of the 3D conduit printing device.

5. The method of claim 4 wherein the indication of the unmanufactured opening is associated with modification of a material in the conduit.

6. The method of claim 5 wherein the modification of the material comprises leaching of a color agent from the material.

7. The method of claim 4 wherein the indication comprises a wireless signal.

8. The method of claim 4 wherein the three-dimensional conduit printing device comprises a propulsion system operable to move the three-dimensional conduit printing device through at least a portion of the conduit.

* * * * *

UNITED STATES PATENT AND TRADEMARK OFFICE
CERTIFICATE OF CORRECTION

PATENT NO. : 9,937,673 B1  
APPLICATION NO. : 14/254174  
DATED : April 10, 2018  
INVENTOR(S) : Charles Lee Oakes, III, Jordan Newmark and Bradly Jay Billman

Page 1 of 1

It is certified that error appears in the above-identified patent and that said Letters Patent is hereby corrected as shown below:

In the Specification

Column 1, Line 4, delete "GROSS" and insert -- CROSS --, therefor.

Signed and Sealed this  
Third Day of July, 2018

Andrei Iancu  
*Director of the United States Patent and Trademark Office*